United States Patent [19]

Karst et al.

[11] Patent Number: 5,020,893

[45] Date of Patent: Jun. 4, 1991

[54] BICONVEX ROD LENS

[75] Inventors: Siegfried Karst, Eisingen; Wilfried Uhrich, Oberderdingen-Flehingen; Rolf Zickwolf, Bretten-Rinklingen, all of Fed. Rep. of Germany

[73] Assignee: Richard Wolf, GmbH, Fed. Rep. of Germany

[21] Appl. No.: 434,356

[22] Filed: Nov. 13, 1989

[30] Foreign Application Priority Data

Nov. 22, 1988 [DE] Fed. Rep. of Germany ....... 3839364

[51] Int. Cl.$^5$ ............................................. G02B 23/16
[52] U.S. Cl. .................................... 350/573; 350/479
[58] Field of Search ............ 350/479, 320, 242, 96.26, 350/573

[56] References Cited

U.S. PATENT DOCUMENTS 4,148,550  4/1979  MacAnally ......................... 350/320
4,148,551  4/1979  MacAnally ......................... 350/320
4,608,966  9/1986  Storz ................................. 128/4

FOREIGN PATENT DOCUMENTS 3113110  10/1982  Fed. Rep. of Germany .
3431631   3/1986  Fed. Rep. of Germany .

Primary Examiner—Bruce Y. Arnold
Assistant Examiner—Rebecca D. Gass
Attorney, Agent, or Firm—Hill, Van Santen, Steadman & Simpson

[57] ABSTRACT

A biconvex rod lens for the optics assembly of a medical or technical endoscope comprises of a light transmitting rod and a correcting lens cemented to one end of the rod. The rod is provided with at least one cylindrical collar which is of greater diameter than the adjacent lengths of the rod, for supporting the rod lens on the inner surface of an internal tube in the shaft of the optics assembly. In order to avoid shear forces arising in the cemented joint between the rod and the correcting lens when the shaft and thus the tube are bent when the endoscope is in use, the correcting lens and the rod have, in the region of the cemented joint, a smaller diameter than the cylindrical collar or collars. Fracture of the rod lens is there by avoided.

15 Claims, 2 Drawing Sheets

BICONVEX ROD LENS

FIELD OF THE INVENTION

The invention relates to a biconvex rod lens for the optics assemblies of medical and technical endoscopes, and the rod lens comprises a light transmitting rod and a correcting lens cemented onto an end of the rod, which is provided with at least one cylindrical collar having a greater diameter than the adjacent parts of the rod, and by means of which collar or collars the rod lens can be supported on the inner surface of an internal tube of the optics assembly, in the endoscope shaft.

Such lenses are needed in order to increase the light transmitting efficiency of the optics assemblies of endoscopes. Because of their length, however, rod lenses when in use in an endoscope optics assembly, are most sensitive to bending of the endoscope shaft and thus bending of the internal tube which receives the lenses will subject the rod lenses to bending stress which can lead to their breakage.

BACKGROUND OF THE INVENTION

There is disclosed in DE-A-31 13 110, a rod lens which is of a smaller diameter centrally than at its ends. Rod lenses so shaped are supported in the internal tube merely at their end regions, so that bending of the tube, which is unavoidable when it is in use, does not cause the rod lenses to be stressed to an extent to result in their breakage. Nevertheless, the cemented joints between the rods and the correction lenses are subjected to shear stress sufficient for risk of their fracture to arise. According to DE-A-34 31 631, cylindrically shaped rod lenses, are supported and centered by spacer rings arranged in the internal tube or on the rod lenses themselves. The rod lenses are supported, however, in the regions where the correction lenses are cemented thereto, so that, in this case also, the cemented joints are subjected to shear when the internal tube is bent.

SUMMARY OF THE INVENTION

It is an object of the invention to provide a rod lens constructed for the avoidance of shear stress in the region of the cemented joint between the rod and the correcting lens when the endoscope shaft and the internal tube of the optics assembly are inevitably bent when the endoscope is in use.

In accordance with the invention, therefore, the correcting lens and the rod in the region of the cemented joint are of a smaller diameter than the cylindrical collar or collars.

It is thereby ensured that the radial support and centering of the rod lens in said internal tube is effected only by way of said collar or collars, while the correcting lens, the region of said cemented joint and an adjacent part of the rod are arranged facing the internal wall of the internal tube but without being in contact therewith, the annulus thus defined between the internal tube and the parts just recited being so dimensioned that when the internal tube is bent it does not touch the correcting lens. Thus, the cemented joint, also, cannot be subjected to shear, since the rod lens is never in contact with the internal tube excepting by way of the cylindrical collar or collars. For economy of manufacture the correcting lens and an adjacent length of the rod are preferably of the same diameter, whilst the remaining length of the rod provides a cylindrical collar of greater diameter than the correcting lens and the adjacent lengths. The cost advantage arises because the correcting lens, which after being cemented to the rod must in any case be reduced in diameter by grinding, can be ground simultaneously with the rod in a single operation.

According to further embodiments of the invention, the rod has a single cylindrical collar which has been reduced at both ends thereof to provide rod lengths of smaller diameter than the collar, one of which lengths carries the cemented-on correcting lens; or several cylindrical collars may be provided, each of which is reduced at both of its ends to provide rod lengths of smaller diameter than the collars.

Economy of manufacture can also be achieved by providing the rod with at least one planar end face, to which a plano-convex lens is cemented as the correcting lens. The other end face of the rod either may be made convex or may be ground flat and provided with a plano-convex lens. Further, at least one end face of the rod may be made convex and a concavo-convex correcting lens cemented thereto.

DETAILED DESCRIPTION OF THE INVENTION

Figure 1:
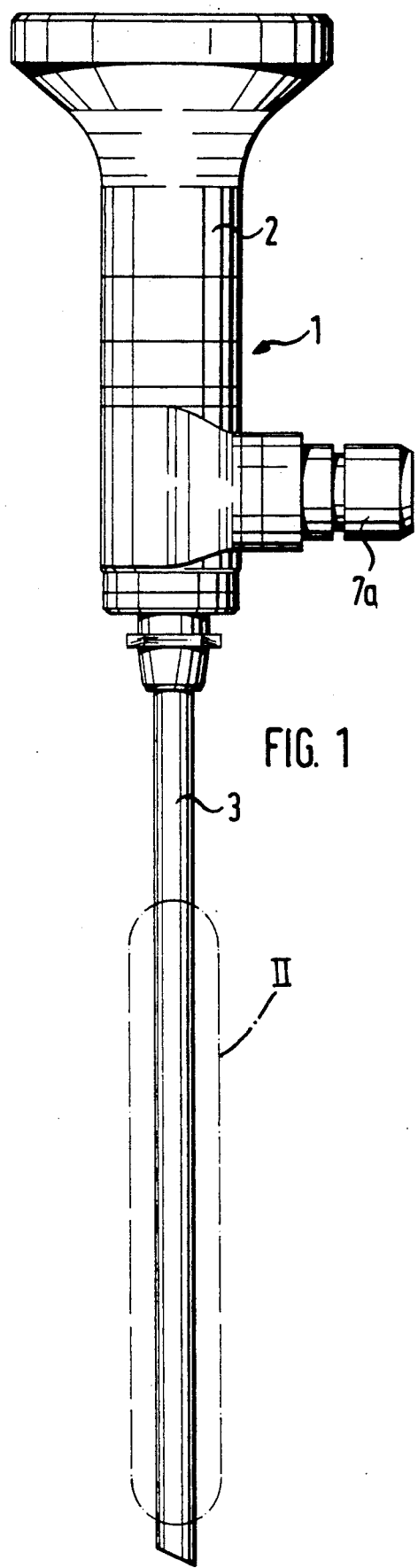
FIG. 1 is a side view of an endoscope optics assembly.
Figure 2:
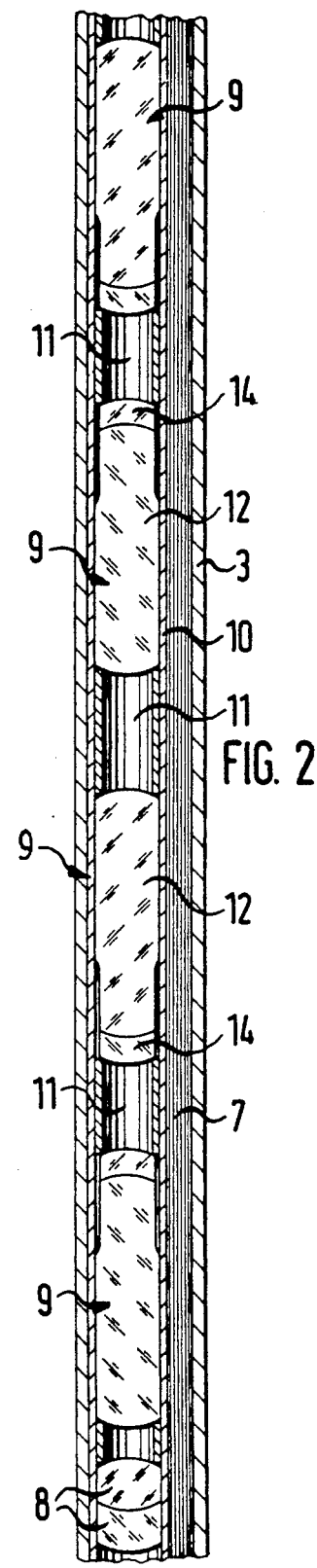
FIG. 2 is a longitudinal sectional view through part of the distal end of the assembly, as indicated by a chain line oval II in FIG. 1.
Figure 3:
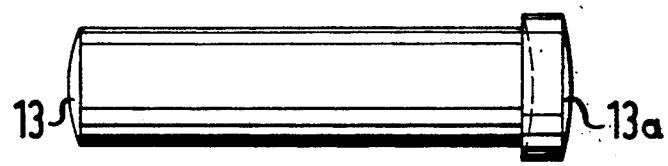
FIG. 3 is a side view of a rod lens for the assembly with the rod lens comprising a rod having a correction lens cemented thereto, and before the lens has been finally worked.

As shown in FIG. 1 an endoscope optics assembly 1 consists essentially of a frusto-conical eyepiece 2 to the proximal end of which is connected a connector 7a for a light guiding cable (not shown), and a tubular outer shaft 3 receiving the optical elements of the assembly, which are described below. As shown in FIG. 2, the shaft 3 has arranged therein eccentrically and in interlocking relationship therewith, a thin walled internal tube 10 containing rod lenses 9 and an objective 8. The shaft 3 and the tube 10 cooperate to define a space which is crescent-shaped as seen in cross-section and in which are arranged light guides 7 for transmitting light led in through the connector 7a, to the distal end of the assembly 1.

The said optical elements consists of the objective 8 which is arranged near the distal end of the shaft 3, and which is shown in simplified form, and a series of the lenses 9 connected to the proximal end of the objective 8. The objective 8 and the lenses 9 are inserted into the tube 10 and are held in longitudinally spaced relationship by means of small aperture or spacing tubes 11.

Each rod lens 9 consists of a light transmitting rod 12 made for example from crown glass and which has convex end faces 13 as shown in FIGS. 3 to 6. At each of the end faces 13 is arranged a concavo-convex correcting lens 14, cemented to the rod 12, and being made, for example, of flint glass, for correcting image defects associated with spherical and chromatic longitudinal aberation and with astigmatism.

Figure 4:
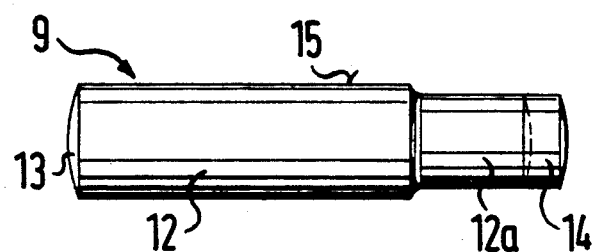
FIG. 4 is a side view of the lens of FIG. 3 after reduction in the diameter of the correction lens and of the rod in the region of the cemented joint, according to a first embodiment of the invention.

When a correcting lens 13a which has not yet been ground at its periphery (FIG. 3) has been cemented to the rod 12, the diameter of the lens 14 and of a length 12a of one end portion of the rod 12 adjacent to the lens 14 is reduced by grinding, so that about two thirds of the total length of the rod lens 9 remains as a cylindrical collar 15, the diameter of which is that of the rod 12 before the grinding operation, as shown in FIG. 4. The difference between the diameter of the collar 15 and that of the reduced diameter part of the rod 12a is preferably in the range of 0.02 mm to 0.15 mm.

Figure 5:
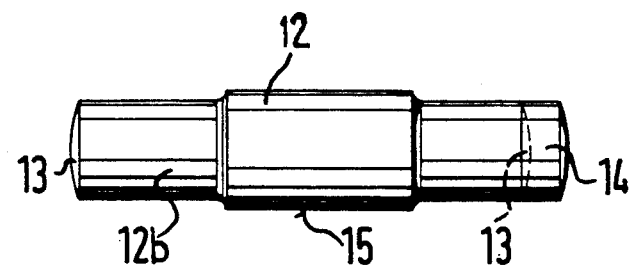
FIG. 5, is a side view of a rod lens according to a second embodiment of the invention with the rod lens being reduced in diameter at both ends.

According to the embodiment of FIG. 5, the diameter of the other end portion 12b of the rod 12 is similarly reduced so that the collar 15 extends along only about one third of the total length of the rod lens.

Figure 6:
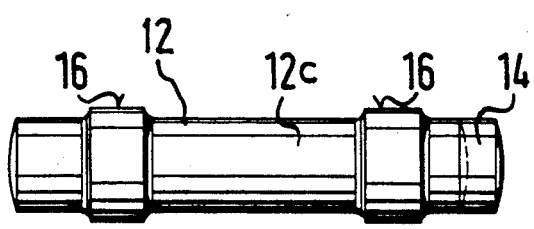
FIG. 6 is a side view of a rod lens with a diameter being stepped centrally thereof and at both ends according to a third embodiment of the invention.

In the embodiment of FIG. 6, the diameter of the rod 12 is reduced in the central region 12c thereof as well as both end portions of the rod 12 being simiarly reduced, to provide two cylindrical collars 16 for centering the rod lens in the internal tube 10 of the optics assembly 1.

Figure 7:
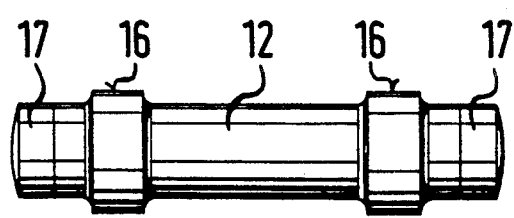
FIG. 7 is a side view of the rod lens of FIG. 6 but with plano-convex lenses cemented to both ends.

In the case of the embodiment of FIG. 6 and of those described above with reference to FIGS. 3 to 5, the rod 12 may, instead of being provided with a concavo-convex lens 14, be provided with plane parallel end faces to which are cemented plano-convex lenses 17 as shown in FIG. 7, one of which lenses serves as a correcting lens.

The rod 12 may, however, be ground so that it is convex at one end and is planar at its other end, a plano-convex lens being cemented to the surface of the planar end and a correcting lens being cemented to the surface of the convex end.

The rods 12 described above with their collars and their reduced diameter regions are components produced in one piece. Rods of the same shapes and dimensions may, however, be made by pushing, a tube or a plurality of tubes, which correspond in length and external diameter to the above described collars, over a glass rod and then joining, the tube or tubes to the glass rod, for example, by connecting or gluing. The tube or tubes may be made of glass, metal, or of plastic material, for example, and may have a cyindrical or bellows shaped body.

What is claimed is:

1. A biconvex rod lens for an optics assembly of an endoscope, the rod lens comprising a light transmitting rod, a correcting lens connected to an end of the rod by means of a cemented joint and at least one cylindrical collar for supporting the rod lens on an inner surface of an internal tube of said assembly, each collar having a greater diameter about the rod than the parts of the rod adjacent to the collar, both the correcting lens and the rod in the region of the cemented joint being of a smaller diameter than the diameter of the collar.

2. A rod lens as claimed in claim 1, wherein end portions of the rod on each side of the collar are of a smaller diameter than the collar, the correcting lens being cemented to the end of one of said end portions.

3. A rod lens as claimed in claim 2, wherein the rod has at least one planar end face and a plano-convex lens cemented to said planar end face.

4. A rod lens as claimed in claim 2, wherein the rod has at least one convex end face and a concavo-convex correcting lens cemented to said convex end face.

5. A rod lens as claimed in claim 1, wherein the rod is provided with at least two cylindrical collars with portions of the length of the rod on each side of each collar being of a smaller diameter than that collar.

6. A rod lens as claimed in claim 5, wherein the rod has at least one planar end face and a plano-convex lens cemented to said planar end face.

7. A rod lens as claimed in claim 5, wherein the rod has at least one convex end face and a concavo-convex correcting lens cemented to said convex end face.

8. A rod lens as claimed in claim 1, wherein the rod has at least one planar end face and a plano-convex lens cemented to said planar end face.

9. A rod lens as claimed in claim 1, wherein the rod has at least one convex end face and a concavo-convex correcting lens cemented thereto.

10. A rod lens according to claim 1, wherein the correcting lens and part of the length of the rod adjacent thereto are of the same diameter, and a remainder of the rod forms said collar.

11. A rod lens as claimed in claim 10, wherein the rod has at least one convex end face and a concavo-convex correcting lens cemented to said convex end face.

12. A biconvex rod lens according to claim 1, wherein said light transmitting rod and collar are a one-piece component.

13. A biconvex rod lens for an optics assembly of an endoscope, the rod lens comprising a light transmitting rod, a correcting lens connected to an end of the rod by means of a cemented joint, said lens and a portion of the rod adjacent said cemented joint having a reduced diameter less than the diameter of a remaining portion of the rod to form at least one cylindrical collar for supporting the rod lens on an inner surface of an internal tube of said assembly so that the correcting lens and the rod in the region of the cemented joint are not subjected to stresses from bending of said tube.

14. A biconvex rod lens according to claim 13, which includes a second reduced diameter portion for said rod spaced from said first-mentioned reduced diameter portion by said collar.

15. A biconvex rod lens according to claim 13, wherein the collar extends from the reduced diameter portion to the opposite end of said transmitting rod.

* * * * *